US009178696B2

(12) United States Patent
Blom et al.

(10) Patent No.: US 9,178,696 B2
(45) Date of Patent: Nov. 3, 2015

(54) KEY MANAGEMENT FOR SECURE COMMUNICATION (75) Inventors: Rolf Blom, Jarfalla (SE); Yi Cheng, Sundbyberg (SE); Fredrik Lindholm, Alvsjo (SE); John Mattsson, Taby (SE); Mats Naslund, Bromma (SE); Karl Norrman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 753 days.

(21) Appl. No.: 12/744,986

(22) PCT Filed: Nov. 30, 2007

(86) PCT No.: PCT/SE2007/050927
§ 371 (c)(1),
(2), (4) Date: May 27, 2010

(87) PCT Pub. No.: WO2009/070075
PCT Pub. Date: Jun. 4, 2009

(65) Prior Publication Data
US 2010/0268937 A1 Oct. 21, 2010

(51) Int. Cl.
*H04L 9/08* (2006.01)
*H04L 29/06* (2006.01)
(52) U.S. Cl.
CPC .............. *H04L 9/0838* (2013.01); *H04L 63/061* (2013.01); *H04L 63/062* (2013.01); *H04L 63/0884* (2013.01); *H04L 9/083* (2013.01); *H04L 65/1016* (2013.01)
(58) Field of Classification Search
CPC ..... H04L 9/083; H04L 63/061; H04L 63/062; H04L 63/0884
USPC ......................................................... 713/171
See application file for complete search history.

(56) References Cited

U.S. PATENT DOCUMENTS 5,535,276 A * 7/1996 Ganesan ................. H04L 9/825
380/46
6,041,123 A * 3/2000 Colvin, Sr. .............. H04L 9/083
713/153
(Continued)

FOREIGN PATENT DOCUMENTS

EP 0810754 A1 12/1997
EP 1865656 A1 12/2007
(Continued)

OTHER PUBLICATIONS

Universal Mobile Telecommunications System (UMTS); Network domain security; Authentication framework (NDS/AF) (3GPP TS 33.310 version 7.1.0 Release 7); Sep. 2006.*
(Continued)

*Primary Examiner* — James Turchen
(74) *Attorney, Agent, or Firm* — Rothwell, Figg, Ernst & Manbeck, P.C.

(57) ABSTRACT

A method and arrangement is disclosed for managing session keys for secure communication between a first and at least a second user device in a communications network. The method is characterized being independent of what type of credential each user device implements for security operations. A first user receives from a first key management server keying information and a voucher and generates a first session key. The voucher is forwarded to at least a responding user device that, with support from a second key management server communicating with the first key management server, resolves the voucher and determines a second session keys. First and second session keys are, thereafter, used for secure communication. In one embodiment the communication traverses an intermediary whereby first and second session keys protect communication with respective leg to intermediary.

20 Claims, 6 Drawing Sheets

(56) References Cited

U.S. PATENT DOCUMENTS

| | | | | |
|---|---|---|---|---|
| 7,194,543 B2* | 3/2007 | Robertson | G06Q 10/06 | 709/223 |
| 7,213,143 B1* | 5/2007 | Watson | H04L 63/0428 | 713/151 |
| 7,243,370 B2* | 7/2007 | Bobde | H04L 29/06027 | 726/10 |
| 7,353,388 B1* | 4/2008 | Gilman | H04L 63/06 | 713/168 |
| 7,395,549 B1* | 7/2008 | Perlman | H04L 9/0825 | 380/279 |
| 7,418,596 B1* | 8/2008 | Carroll | H04L 63/068 | 380/247 |
| 7,421,411 B2* | 9/2008 | Kontio | G06F 21/10 | 380/200 |
| 7,545,768 B2* | 6/2009 | Haverinen | H04L 63/06 | 370/328 |
| 7,549,048 B2* | 6/2009 | Freeman | G06F 21/31 | 713/171 |
| 7,558,957 B2* | 7/2009 | Patel | H04L 9/844 | 713/169 |
| 7,628,322 B2* | 12/2009 | Holtmanns | G06Q 20/3552 | 235/380 |
| 7,646,872 B2* | 1/2010 | Brown | H04L 63/061 | 380/277 |
| 7,835,528 B2* | 11/2010 | Bajko | H04L 63/067 | 380/277 |
| 7,843,948 B2* | 11/2010 | Bajko | H04L 29/12103 | 370/252 |
| 7,975,140 B2* | 7/2011 | Fedyk | H04L 9/0833 | 380/279 |
| 7,984,486 B2* | 7/2011 | Vinayakray-Jani | H04L 63/062 | 713/160 |
| 7,987,366 B2* | 7/2011 | Blom | H04L 9/0844 | 380/278 |
| 8,184,641 B2* | 5/2012 | Alt | H04L 29/06027 | 370/352 |
| 8,214,635 B2* | 7/2012 | Wang | H04L 63/0464 | 713/156 |
| 8,301,883 B2* | 10/2012 | Sundaram | H04L 9/0825 | 380/270 |
| 8,582,567 B2* | 11/2013 | Kurapati | H04L 29/06027 | 370/352 |
| 8,705,743 B2* | 4/2014 | Howard | H04L 63/0428 | 380/255 |
| 2003/0217165 A1* | 11/2003 | Buch | H04L 29/06027 | 709/229 |
| 2004/0030918 A1* | 2/2004 | Karamchedu | G06F 21/606 | 726/3 |
| 2004/0249768 A1* | 12/2004 | Kontio | G06F 21/10 | 705/65 |
| 2007/0074275 A1* | 3/2007 | Bajko | H04L 63/067 | 726/4 |
| 2007/0086591 A1* | 4/2007 | Blom | H04L 63/0435 | 380/279 |
| 2007/0101122 A1 | 5/2007 | Guo | | |
| 2007/0121582 A1 | 5/2007 | Fries | | |
| 2007/0294186 A1* | 12/2007 | Yan | G06Q 20/3829 | 705/71 |
| 2008/0019527 A1* | 1/2008 | Youn | H04L 9/083 | 380/278 |
| 2008/0162646 A1* | 7/2008 | Pizano | H04L 51/12 | 709/206 |
| 2008/0162935 A1* | 7/2008 | Ginzboorg | H04L 9/0822 | 713/170 |
| 2008/0215888 A1* | 9/2008 | Barriga | H04L 63/0807 | 713/176 |
| 2008/0232598 A1* | 9/2008 | Vennelakanti | G06F 21/62 | 380/279 |
| 2008/0256616 A1* | 10/2008 | Guarraci | H04L 63/08 | 726/9 |
| 2008/0307518 A1* | 12/2008 | Holtmanns | H04L 63/12 | 726/12 |
| 2009/0126001 A1* | 5/2009 | Krantz | G06F 21/33 | 726/10 |
| 2009/0220091 A1* | 9/2009 | Howard | H04L 63/0428 | 380/277 |

FOREIGN PATENT DOCUMENTS

| | | | | |
|---|---|---|---|---|
| GB | 2384406 A | 7/2003 | | |
| WO | 2005078988 A1 | 8/2005 | | |
| WO | WO 2005078988 A1 * | 8/2005 | | H04L 9/00 |

OTHER PUBLICATIONS

Handbook of Applied Cryptography; Alfred J Menezes et al.; Fifth Printing (Aug. 2001); Chapter 13.*

An offer/answer model with the session description protocol; J. Rosenberg et al.; RFC 3264; Jun. 2002.*

Alternatives to MIKEY/SRTP to secure VoIP; Joachim Orrblad; KTH Microelectonics and Information Technology; Mar. 2005.*

Okamoto, E., "Cryptographic technology intended to achieve bright information society (5): distribution and management of cryptographic key", bit, Japan, Kyoritsu-syuppan K.K., Nov. 1, 1991, vol. 23, No. 12, pp. 51-59.

Mambo, M., et al., "Cryptography latest circumstances 7: security infrastructure Yaksha", bit, Japan, Kyoritsu-syuppan K.K., Jul. 1, 1996, vol. 28, No. 7, pp. 104-114.

Office Action issued in corresponding Japanese application No. 2010-535908 on Dec. 14, 2012, 6 pages.

Office Action issued in corresponding New Zealand application No. 585054 on Jan. 22, 2013, 2 pages.

Supplementary European Search Report issued on Oct. 2, 2013 in corresponding European application No. 07 85 2199, 7 pages.

Baugher, M., et al., "The Secure Real-time Transport Protocol (SRTP)", Network Working Group, Request for Comments: 3711, Mar. 2004, 56 pages.

Arkko, J., et al., "MIKEY: Multimedia Internet KEYing", Network Working Group, Request for Comments: 3830, Aug. 2004, 66 pages.

Arkko, J., et al., "Key Management Extensions for Session Description Protocol (SDP) and Real Time Streaming Protocol (RTSP)", Network Working Group, Request for Comments: 4567, Jul. 2006, 30 pages.

* cited by examiner

KEY MANAGEMENT FOR SECURE COMMUNICATION

CROSS-REFERENCE TO RELATED APPLICATION

This application is a 35 U.S.C. 371 National Phase Application from PCT/SE2007/050927, filed Nov. 30, 2007, and designating the United States.

FIELD OF INVENTION

The invention is in the field of establishing secure communication between end points. In particular, the invention eliminates requirement that both end points use same type of basic credential.

BACKGROUND

Many access technologies such as GSM, WCDMA, WLAN, WiMAX provide basic security for the first hop, i.e., communication between the user device and an access point of the network. The communication may use layer 2 or layer 3 in the protocol stack. SRTP (RFC3711) and MIKEY (RFC3830) are examples of protocols for media security and key management. MIKEY can be based on both pre-shared keys and PKI. Moreover, MIKEY can be integrated into session set-up signalling (SIP or RTSP) using RFC4567.

However, the basic security provided by these access technologies can not always be considered sufficiently secure. In fact, some access technologies do not provide any basic security, e.g. 802.3/Ethernet or DSL.

Therefore, there is a need to provide added or improved security mechanisms in many access technologies.

A problem with existing approaches to key management relates to the assumption that both end-points use the same type of basic credential. However, this assumption is not always true which is the case in, e.g., Fixed-Mobile Convergence (FMC). In FMC one of the users may be a 3GPP subscriber using SIM-based credential, e.g. SIM, USIM, ISIM, and the other may be e.g. a Cable access user that implements PKI-based credentials.

There are also certain problems with integration of key management into known signalling protocols.

Another example presenting a problem relates to "early media" meaning that media may start to flow back from the responder before the key management operations according to e.g. MIKEY-over-SIP has finished. Thus, although MIKEY may be carried in-band with SIP, there may not be any keys available to protect the first few packets. The alternative, using media-in-band key management would solve this problem but is disadvantageous e.g. from firewall traversal point of view. Furthermore, it is not sound engineering practice to carry signalling in the media path.

Another problem with known methods for key management relates to "forking" wherein the initiator of, e.g., a Multimedia Telephony call (MMTEL) may not be sure which terminal the other end-point will use to answer. Even if all the terminals for answering the call are PKI-enabled, different terminals may use different public keys and thus the initiator cannot know which key to use for an invitation request. More precisely, according to known methods it is not until after the responder has answered that key management can even start and that an appropriate public key can be determined. As mentioned above, media-in-band key management may alleviate the problem, however, being disadvantageous as mentioned above.

Still another problem with known methods for key management is that some IMS services are peer-to-peer (P2P) whereas others provide group services e.g. Push-to-talk over cellular PoC). Requiring users to manage group keys raises problems and, in fact, a user cannot be sure that all group members will even reply to an invitation and participate in the session. There is, thus, in this case a need to make a distinction between members that potentially could be in the group session and the members that are participating in the group session, since it may, e.g., be beneficial to only distribute session keys to the members who are actually participating.

A further problem with prior art is that some services, e.g. messaging, may be handled in different ways depending on whether the responder is on line or not. For instance, an instant message (IM) may automatically be converted into a deferred message (DM) for later delivery if the receiver is not on-line. The sender may not know if the other party is on-line and may thus not know what key management is suitable at the time of sending the message. S/MIME based solutions could possibly alleviate the situation, but S/MIME is not suitable for real-time media such as MMTEL. Therefore, the key management approach may become dependent on which IMS service that is being used which is undesirable. In addition, S/MIME lacks support for pre-shared keys (e.g. SIM) and does not provide replay protection due to the fact that there is no session concept in which two S/MIME protected messages can be correlated.

SUMMARY

It is a general object of the invention to overcome deficiencies of known methods for establishing secure communication between an initiating party and a responding party by establishing of shared keys between the end-points that could be used directly for media protection or form the basis for end-to-end key agreement.

It is an object to establish keys for secure communication between initiating and responding party that provides for independence of type of credential used by respective party for management of security.

According to the invention, a key management server, KMS, having capability to establish a shared key with a user device, provides the user with a voucher and key generation information in response to a key request. A first user, having received said information, calculates a session key and transmits the voucher to a second party in a request for communication. The second party, in response to receiving the voucher, establishes a secure communication with same or other KMS entity and provides the voucher. In response thereto, the same or other KMS returns key generation information. Based on said key generation information, both first and second party generates a common session key.

The voucher is advantageously integrity protected by the issuing KMS entity and may further include metadata, exemplary identities of involved parties, time of creation, sequence number, time of validity, type of usage such as push-to-talk over cellular or telephony, type of communication e.g. peer-to-peer or group communication. Furthermore, the voucher may include copies of session keys and other information that requires to be encrypted exemplary to protect privacy.

In one embodiment of the invention, the capability to establish a shared key is based on the GBA procedure wherein a user and network BSF functionality are provided with a basic shared secret, e.g. SIM/USIM/ISIM-based secret. The KMS entity, according to this embodiment, acts as a NAF-entity towards the BSF-entity.

According to another embodiment, the session keys generated by the respective first and second party are different whereby an intermediate party is arranged to generate both these keys for secure communication with each of first and second party, wherein the intermediate party is capable of processing a message from first to second party by first decrypting the message and, following processing, re-encrypting the message. In particular, key generation at the intermediate party is based on a voucher received from the first party which, following key generation, is forwarded to the second party for corresponding session key generation.

In still another embodiment, the second party is represented by a group of second parties and the intermediate party, using a voucher, first generates a master key and, based on the master key, generates individual session keys and vouchers for each member of the group of second parties. The intermediate party, following key generation, forwards the voucher to each of the second parties each of which thereafter generates corresponding individual session keys. The group of second parties may be obtained at the intermediate party by resolving a group identity or identifying a pre-defined group as specified by first party.

In yet another embodiment, the intermediate party does not process information received from the first party and, therefore, need not generate separate keys for communication with each of first and second party. In this embodiment the intermediate party forwards the voucher received from the first party to each of second parties in the group whereby first and each of second parties may generate a shared session key for secure end-to-end communication. In order to eliminate possibility to intercept the voucher at an intermediate party and use intercepted voucher to request a KMS functionality to resolve the voucher into a session key, KMS entity is provided with functionality for checking that a user, for which it resolves a voucher, is member of the group.

A message from first party intended for at least a second party may be stored at network entity for deferred delivery. Exemplary, the intermediate party may discover that at least a second party is not registered on the network and may, therefore, store a message for later delivery together with a voucher. Once the at least a second party has registered the network entity temporarily storing a message may continue the protocol as described above and finally push the message and associated voucher to the intended party.

According to one embodiment, the invention is implemented in a 3GPP IMS-environment.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

Figure 1:
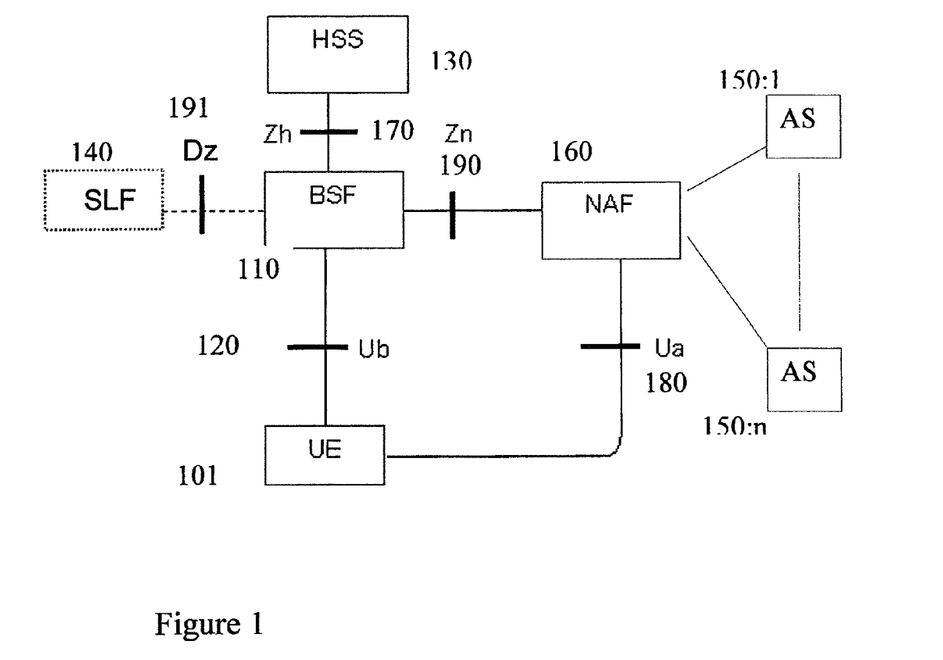
FIG. 1 illustrates prior art deployment of GBA/GAA through an authentication proxy 160 acting as a Network Application Function NAF against the GBA/GAA infrastructure.

For the purpose of illustration of management of security keys, 3GPP GBA/GAA architecture will be used. However, it is readily understood from the description that any other method for management of security keys may be used that provides for the generation of a shared key between a user UE and an application server, e.g. NAF 160. For example, a UE supporting PKI based credentials could use TLS to create a shared key with the application server. In a username/password based architecture, the PKCS#5 standard could be used to establish a shared key, etc, etc.

FIG. 1 illustrates prior art deployment of GBA/GAA through an authentication proxy 160 acting as a Network Application Function NAF against the GBA/GAA infrastructure. A generic Bootstrapping Server Function 110 BSF and a User Equipment 101 UE mutually authenticates using the UMTS AKA protocol. UE communicates with BSF over an interface 120 Ub. UE and a Home Subscriber System 130 (HSS) shares a key that is basis for HSS to generate an authentication vector provided to BSF over interface 170 Zh. According to the AKA protocol, BSF sends to UE a challenge and UE returns a response to BSF. Authentication is verified by BSF comparing the UE response with an expected response as provided by HSS. Successful authentication initiates at BSF and UE generation of a shared key Ks. BSF stores the key Ks and associated reference B-TID. The reference B-TID and other data, such as a key lifetime, are thereafter provided to UE in a completion message. A Subscriber Locator Function 140 SLF is queried by the BSF over interface 191 Dz in conjunction with the Zh interface operation to get the name of the HSS containing the required subscriber specific data. UE may connect simultaneously to at least one Application Server AS 150_n through a Network Application Function authentication proxy NAF 160. The connection comprises a first step of authentication between UE and NAF. Thereby, UE provides the reference B-TID to NAF that, using B-TID, requests a key (Ks_NAF) from BSF over interface 190 Zn. The key Ks_NAF is derived from the key Ks. The same key may be derived at UE. Authentication is thereafter, made based on the derived key Ks_NAF. The communication between UE and NAF is over an interface Ua 180.

For purpose of illustration SIP based signalling according to 3GPP IMS is used in the following description. However, as is readily understood by someone skilled in the art, the invention can use other protocols that are capable to carry required metadata for session set-up.

Figure 2:
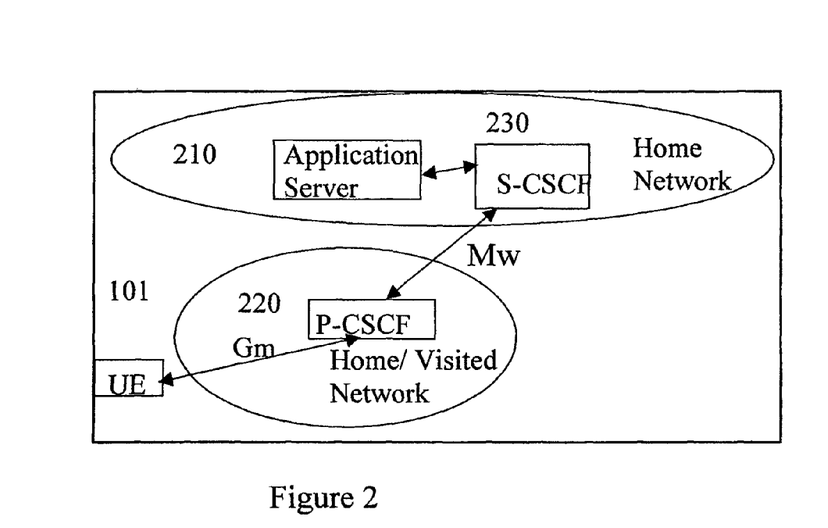
FIG. 2 illustrates basic elements of an IMS core network CN subsystem and connection to application server 210.

FIG. 2 illustrates basic elements of an IMS core network CN subsystem and connection to application server 210. Although FIG. 2 indicates application server located within a home network it shall be understood that the service platform may also be located external to the home network.

The IP multimedia core network (IM CN) subsystem enables PLMN and fixed-line operators to offer their subscribers multimedia services based on and built upon Internet applications, services and protocols. The intention is that such services will be developed by PLMN operators and other third party suppliers including those in the Internet space using the mechanisms provided by the Internet and the IMS system. The IMS system enables the convergence of, and access to, voice, video, messaging, data and web-based technologies for the fixed-line and wireless user.

The Proxy-CSCF (P-CSCF) 220 is the first contact point within the IMS system responding to a SIP INVITE message from UE. Its address may be discovered by UE 101 using a discovery mechanism. The P-CSCF behaves like a Proxy i.e. it accepts requests and services them internally or forwards them on towards the serving CSCF, S-CSCF 230. The S-CSCF routes the SIP request towards the Home Network Application Server 210.

Figure 3:
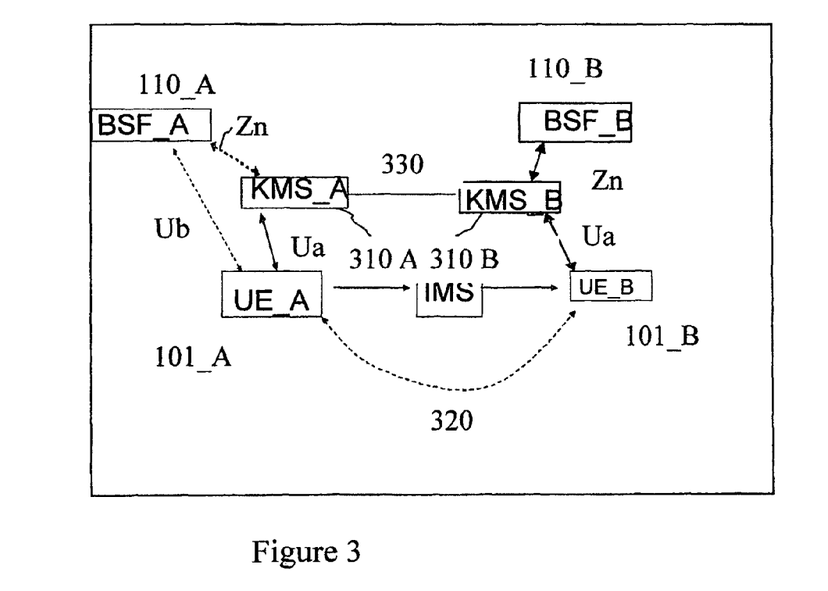
FIG. 3 is a diagram for describing a first embodiment.

A first embodiment of the invention will now be described with reference to FIG. 3. In FIG. 3 like numerals correspond to like entities in FIGS. 1 and 2. There is shown in FIG. 3 two user entities UE_A and UE_B capable of performing bootstrapping according to GBA/GAA method with respective bootstrapping functions BSF_A, 110_A and BSF_B 110_B. However, as is readily understood by one skilled in the art, any other means available to create a shared key with such a server can be used. Thus, the bootstrapping may thus be based on identity card credential e.g. SIM, USIM or ISIM, or PKI, or username/password. The bootstrapping results in that each UE and associated BSF may determine a shared key Ks_A respectively Ks_B. Users A and B wish to set up a communication illustrated at 320. According to the invention, each UE is supported by a key management server KMS_A and KMS_B denoted by 310_A and 310_B respectively.

According to the invention, the users A and B may base their respective security management on different credentials, e.g. based on identity card such as a *SIM-card (SIM, USIM, ISIM), username/password, public key PKI, or password.

Inter-domain network signalling between key management entities KMS, indicated at 330, may be secured using e.g. TLS or IPsec. The signalling may be encrypted and/or integrity protected.

The usual GBA/GAA-interfaces Ua, Ub, Zn are indicated in FIG. 3 in correspondence with FIG. 1.

Figure 4:
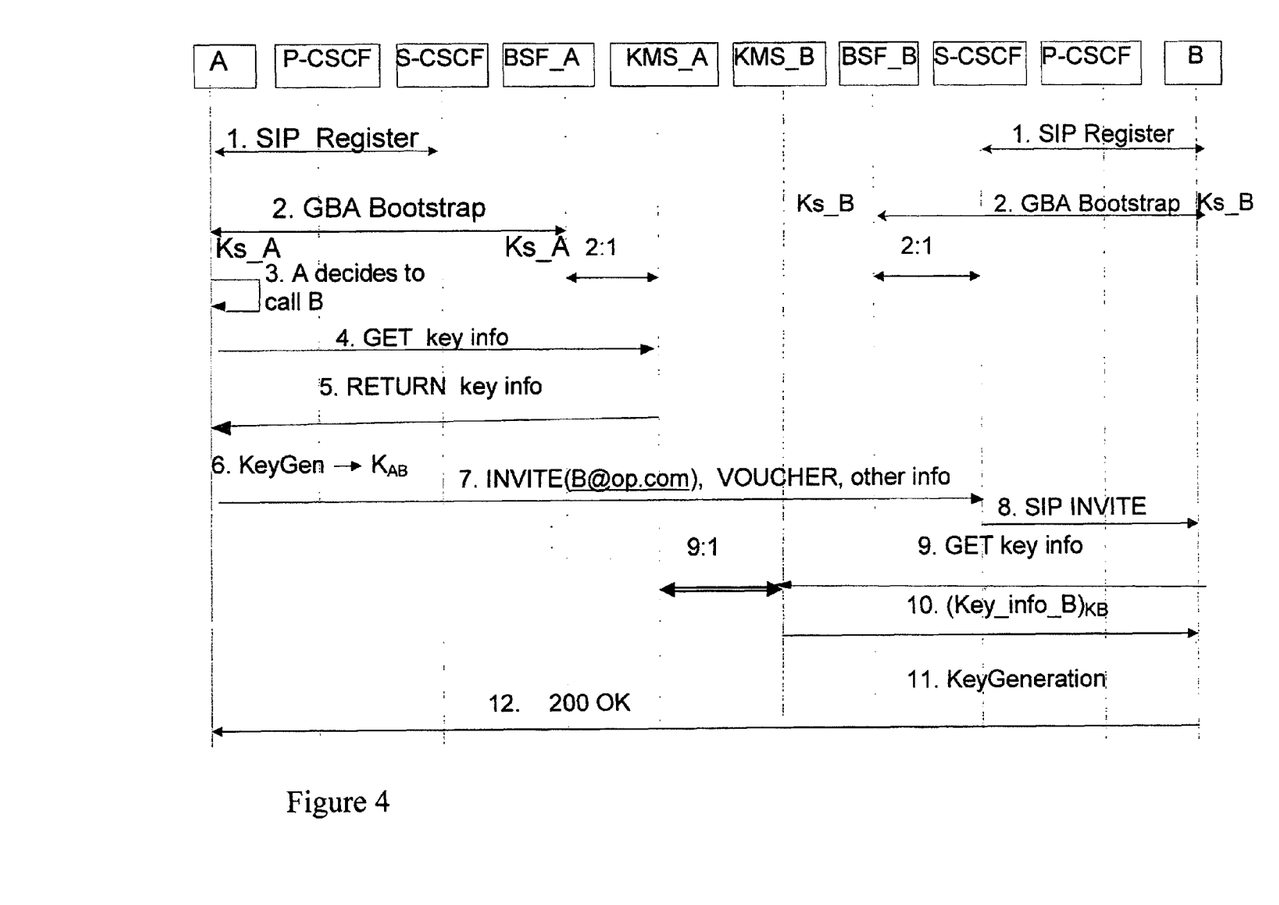
FIG. 4 shows a signal diagram according to an embodiment of the invention.

We now refer to FIG. 4 showing a signal diagram according to an embodiment of the invention. In FIG. 4 entities from IMS structure and GBA/GAA structure are indicated as explained in relation to FIGS. 1-3. For simplicity user A will also be denoted UE_A interchangeably.

In the following $(x)_K$ denotes protection of x by key K. By protection shall be understood confidentiality and/or integrity protection and that confidentiality protection may be applied only to parts of a message x.

Steps 1 and 2 according to prior art are now performed.

In step 1 user A registers in IMS.

In step 2 user A performs a GBA bootstrap whereby a key Ks_A is generated and shared between A and BSF_A. In this step A is provided by BSF_A with a reference B-TID_A. Step 2 includes sub-step 2:1 wherein KMS_A receives from A the reference B-TID which is further used to fetch from BSF_A a key KA=Ks_KMS_A derived from Ks_A. User A calculates the same key knowing Ks_A and other information entered into the derivation. Thus, A and KMS_A share a key KA which can be used for secure communication.

Corresponding steps are performed at the B-side indicated in FIG. 4 with the same reference numbers whereby corresponding entities are generated, i.e. Ks_B, B-TID_B, and KB=Ks_KMS_B.

It should be noticed that B as user, may have several devices each of which could be used for the communication. The key KB, however, is only valid for a particular device having performed bootstrap according to steps 1 and 2. The case that B can use several devices may lead to a forking problem further discussed in an alternative embodiment. For the present first embodiment B is assumed to respond to an invitation for communication using only one device.

At 3, user A decides to communicate with user B.

At step 4, A sends a key request to key management server KMS_A according to the invention. The key generated in this step will subsequently be used for secure end-to-end communication with B. The key request has the format:

GET key info=(Id_A, Id_B, key_type, param, . . . )$_{KA}$, B-TID_A

Where Id_A and Id_B are identities identifying users A and B respectively, key_type is type of key requested, e.g a key for point-to-point communication or a key for group communication. Id_A may have the form of a global identifier, exemplary Id_A =A@op.com. Finally, param denotes any other parameters that can be included in the message. The message is encrypted by the previously generated key KA. In addition, the reference B-TID is included in the message allowing KMS_A to obtain the key KA from BSF_A according to GBA/GAA procedure. Alternatively, in a non-GBA based approach to bootstrapping, some other key-identifier would be used if Id_A does not uniquely determine the key KA. It is noticed that nothing is herein mentioned about type of credential that the receiver B is using and, therefore, the method according to the invention is independent of type of credential at sender A or receiver B.

At 5, KMS_A replies to A with a message "RETURN key info" of the form:

RETURN key info=(Key_info_A, VOUCHER)$_{KA}$

Wherein Key_info_A comprises a key $K_{AB}$ or keying material enabling A to calculate, in step 6, a key $K_{AB}$. The entity VOUCHER, according to the invention, comprises information that shall enable KMS_B to subsequently re-generate the same key $K_{AB}$ enabling A and B to communicate securely. In order that KMS_B shall know about KMS_A, the voucher includes Id_A.

The voucher is, further, integrity protected and at least parts of it may be encrypted. Exemplary integrity and confidentiality keys may be derived from the key KA.

The key $K_{AB}$ can for instance be generated as a cryptographic function of KA and the identities of A and B and/or a nonce. In this case, Key_info_A would contain said nonce. Alternatively $K_{AB}$ can be a completely random key, in which case Key_info_A comprises the key $K_{AB}$ itself.

According to the present embodiment, the voucher information includes a pointer exemplary B-TID for retrieval of the key $K_{AB}$ or keying material stored at KMS_A. Other information may be included in the voucher such as, e.g., the key type information such as peer-to-peer or group communication, identities of involved parties, issuer of voucher i.e. identity of KMS_A, time of issue or sequence number, time of validity, usage type such as push over cellular (PoC) or multimedia telephony (MMTEL).

In step 7, A directs a SIP INVITE to user B that, according to the IMS infrastructure, passes P-CSCF, S-CSCF serving A and reaches S-CSCF serving B. At step 8, the invite message is forwarded to the user B. The invite message includes at least the voucher. Other information in this message may include type of key information.

In step 9, user B forwards the voucher in a "GET key info" message to KMS_B for re-generation there from of the key $K_{AB}$, the message exemplary having the form:

GET key info=VOUCHER, B-TID_B

Here, B-TID_B is the GBA/GAA reference for authentication of user B and establishing of a key KB for secure communication between user B and KMS_B in the same way as discussed above in relation to step 4.

In step 9:1 communication takes place between KMS_A and KMS_B wherein KMS_A supports KMS_B in re-generating the key $K_{AB}$. According to the first embodiment, the voucher includes a pointer generated by KMS_A in step 5 and enabling KMS_A to retrieve keying material, the same as returned in step 5 to user A. Said pointer may be included in a key request communicated in step 9:1 of the form:

pointer, Id_B

Here, pointer is extracted at KMS_B from the voucher and is used to retrieve keying material at KMS_A. Id_B is an identifier of user B. The inclusion of Id_B, by KMS_B, in the key request enables KMS_A to determine that it is the intended user B who requests a key, i.e. that no one else, pretending to be user B, has intercepted the voucher in an attempt to obtain a key for secure communication with the user A.

In response to the key request, KMS_A returns keying information Key_info_B comprising the key $K_{AB}$ or key information that is, thereafter, forwarded by KMS_B in step 10 to user B for generation, in step 11, of the key $K_{AB}$. The keying information in step 10 is encrypted using the key KB exemplary generated in step 9. If only keying material is delivered in step 10, key generation is performed in step 11 generating a key $K_{AB}$.

Step 11 involves user B returning a SIP 200 OK response to the invite signal 7 whereupon the session between A and B starts.

Advantageously, according to the first embodiment, the pointer referred to above comprises the entity B-TID_A.

If the key type information specifies point-to-point communication the key that is returned to KMS_B in step 9:1 is sufficient and no further processing of keys is required.

It is known from the GBA/GAA standard that reference B-TID may have a life time. Therefore, in an alternative embodiment, the KMS_A maintains state by storing at least a previously used B-TID and corresponding key material in order to manage the case that user A has performed a new bootstrap and generated a new B-TID.

Figure 5:
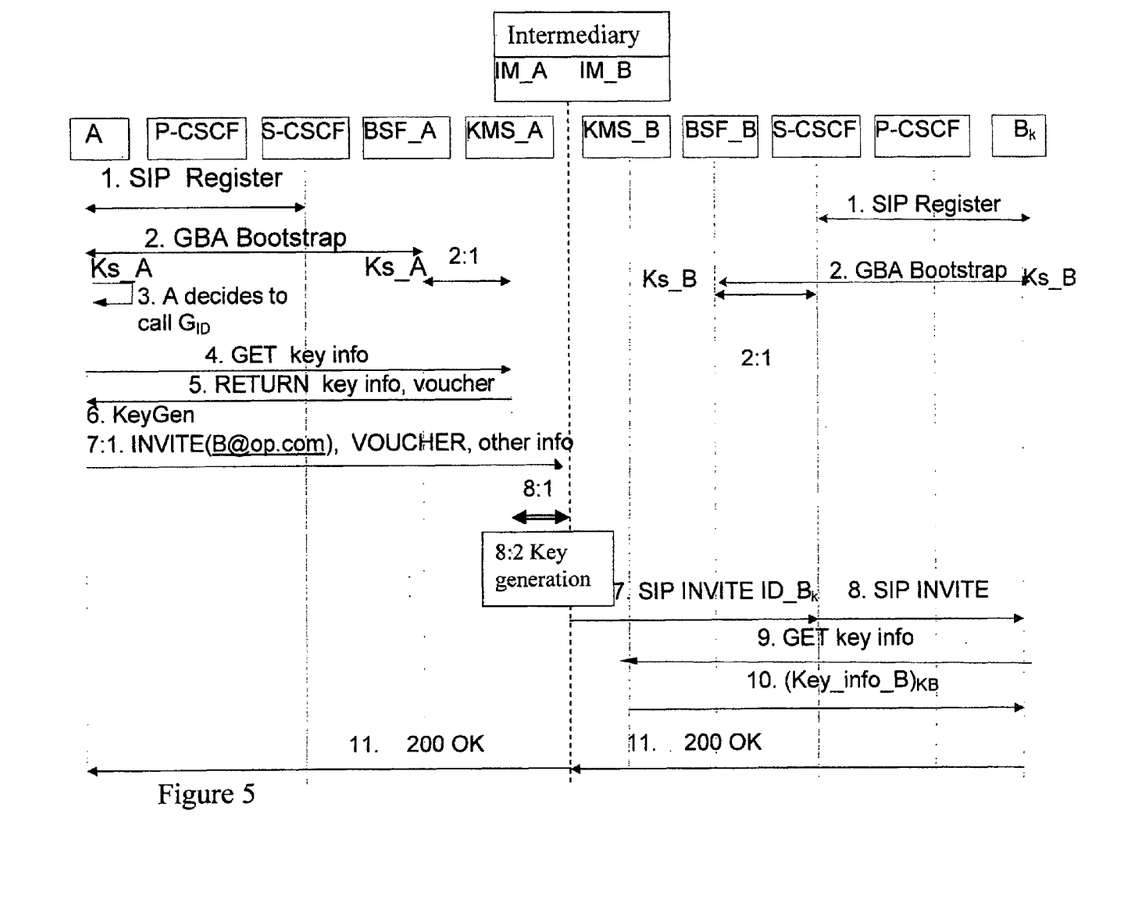
FIG. 5 is a diagram for describing a second embodiment.

With reference to FIG. 5, a second embodiment is described related to the case that the key information (key info) indicates that a group key is requested. In FIG. 5 an intermediary is inserted between the A, and B-sides. Preferably, the intermediary is divided into an A-part intermediary IM_A and a B-part intermediary IM_B. Exemplary, the respective part may comprise a push-to-talk over cellular server, denoted PoC server. In FIG. 5 the notation B of receiving party is now representative of a group of users each having an individual identity ID_$B_k$. Further, for simplicity, it is assumed that each user at the B-side connects to the same BSF_B and the same KMS_B although each user may use separate BSF- and KMS-functionalities.

In FIG. 5 like signal references indicate like signals in FIG. 4 although the signal message parts may be slightly different as further explained below.

Steps 1, 2, 2:1 and 3 are identical to the corresponding steps according to the first embodiment with the exception that in step 3 the called party B now represents a group identified with a group identity $G_{ID}$.

In step 4, the GET message now includes $G_{ID}$. In step 5 a voucher is returned and keying material, e.g. a master key K, for generation, in step 6, of a session key $K_{IMA}$, alternatively the session key is included in the return message. It is noticed here that said session key will subsequently be used by A for communication with the intermediate, e.g. IM_A, rather than directly with group participants. The master key and other information may be protected with the key KA generated in the bootstrapping steps 2, 2:1.

In step 7:1, similar to step 7 in FIG. 4, an INVITE-message is sent to the group via the intermediary or, alternatively, to the IM_A part of the intermediary. The invite message includes the voucher and other information at least comprising $G_{ID}$.

In step 8:1 the intermediary IM_A, recognizing ID_A from the voucher being a group key, forwards the voucher to KMS_A requesting keying material whereupon KMS_A returns to IM_A said master key K. In addition, the session key $K_{IMA}$ is returned or generated at IM_A from the master key.

In step 8:2 IM_A resolves the group identity provided in the invite message into a group of user identities ID_$B_k$ and generates from the master key K an individual session key $K_{IMB}$ for each group member. It is understood that an individual key $K_{IMB}$ is generated for each $B_k$. In addition, if not received from KMS_A, the session key $K_{IMA}$ is generated from the master key K. It should be noted that the intermediary may need support from an associated group management server, not shown, to retrieve the individual group members from the group ID.

The individual key $K_{IMB}$ may be calculated as $K_{IMB}=F(K, "X")$ where "X" denotes some characteristic identifier of party X representative of the group $B_k$.

The session keys $K_{IMA}$ and $K_{IMB}$ are subsequently used for protecting communication links A—intermediary respectively intermediary—B.

In step 7 the intermediary IM_A sends a SIP INVITE message to all group members including the voucher. According to the IMS-infrastructure, the message passes S-CSCF and further, in step 8, through P_CSCF to the network serving the receiver $B_k$. Message 7 corresponds to that message in FIG. 4 although, in the present embodiment, sender is the intermediary rather than the user A.

In step 9, corresponding to step 9 in FIG. 4, each receiver $B_k$ contacts a serving KMS_B for resolving the voucher into appropriate keys.

In step 9:1, similar to the first embodiment, communication takes place between KMS_A and KMS_B wherein KMS_A returns the key $K_{IMB}$, or alternatively the master key K, to KMS_B and there from forwarded in step 10 to each group member, protected with the individual group member key $KB_k$ for simplicity indicated as key KB in FIG. 5 The message 10 corresponds to the same message in FIG. 4. It should be understood that step 10 is repeated for all group members $B_k$. The keys KB are calculated correspondingly to KA and assumes that each $B_k$ has performed bootstrapping with associated BSF functionality. In the case that KMS_A returns the master key K each $B_k$ calculates there from the corresponding key $K_{IMB}$.

At step 11 a 200 OK signals are returned in response to the respective invite signals 7:1, 7, and 8 whereupon the session between A—IM—$B_k$ (k=1, 2, . . . ) may start.

Now, A may communicate with the group members $B_k$ whereby A encrypts communication using key $K_{IMA}$ to the intermediary where the message is decrypted and possibly processed, e.g. transcoded before being forwarded, re-encrypted with key $K_{IMB}$, individually to all $B_k$.

Alternatively, $K_{IMA}=K_{IMB}$.

According to an alternative of the second embodiment, step 8:1 does not include the key $K_{IMA}$ or the master key K. Therefore, in this embodiment, the intermediary can not decrypt the communication from initiating party A for processing. Consequently, the the step of re-encryption of the communication with key $K_{IMB}$ is not relevant. Thus, the intermediary, in this case, acts basically to resolve a group identity into individual responding group members for providing an INVITE message to each member and, subsequently, to forward communication from A to each $B_k$ without any further processing of the information.

An alternative of the second embodiment comprises calculating separate keys for uplink, towards the intermediary, respectively downlink, direction intermediary towards users A and B. Said master key K may be basis for the key generation.

According to an alternative embodiment of the second embodiment key type indicates an ad hoc group key whereby, in step 8:1, IM_A requests keying material K and generates, in step 8:2, a group of user identities ID_$B_k$ from listing of parties provided in the invite message 7:1 from A. Finally, IM_A generates from the master key K an individual key $KB_k$ for each member of the ad hoc group specified by user A.

According to still another alternative of the second embodiment each group member obtains an individual key that may further be different for uplink, direction user B to intermediary IM_A, and downlink, direction intermediary IM_A to user B. Exemplary, IM_A may perform such personalisation of keys according to the scheme:

$$\text{Key\_User\_B}_k\text{\_uplink}=F(K, \text{``}B_k\text{''}, \text{``UPLINK''})$$

Here "$B_k$" denotes some data that is characteristic for individual $B_k$ and K is the master key previously defined. In order for each $B_k$ to generate the same corresponding key, the invite signal in steps 7 and 8 preferably includes the characteristic information "$B_k$" further included in the request message 10 to KMS_B where the personalisation is, thereafter, performed. The personalised key is finally provided user $B_k$ in signal 10.

According to an alternative of the previous still another alternative, the intermediary communicates with the group of $B_k$ through multicast. In this case, all users $B_k$ should use the same group key for receiving downlink information. Thus, no downlink personalisation is made in this case and all users $B_k$ receive the same downlink key from KMS_A.

According to another alternative of the second embodiment the intermediary is not involved in the processing, e.g. transcoding, of the communication from user A and, therefore, it is not provided with capability to decrypt the payload communicated by user A. In this case, therefore, steps 8:1 and 8:2 are omitted and in steps 7 and 8 the voucher is simply forwarded to the group identified by the intermediary IM_A through resolution of the group identifier. The same key-resolving mechanism as in the first embodiment is then used on the receiver side. Effectively, this means that the A and B sides communicate end-to-end without interference of the intermediary.

A general problem may appear, e.g. most likely in the multicast case, is that an unauthorized user having intercepted the intermediary or signalling link and obtained the voucher could forward it to KMS functionality and request to have it resolved. Thus, preferably KMS functionality should be able to check that the users for which it resolves vouchers are authorized members of the group. Therefore, according to this alternative embodiment, a user unique random identifier, or other one-time identifier, is included in the SIP signalling from the intermediary with the voucher. Due to the protection of the SIP signalling, the identifier is protected to an external party managing to access the voucher and the identifier. KMS functionality may check that a random identifier has not already been presented by some other user.

As an alternative, the identifier may also be input to the key derivation for the individual users.

According to first and second embodiments, the keying material obtained in request signal 4 may include one or more session keys $K_{AB}$ or $K_{IMA}$. The received one or more session keys may be used directly or indirectly, e.g. using the MIKEY protocol, to secure payload data.

However, in an alternative of first and second embodiments, the signal 5 may include one or more nonce from which corresponding session keys may be derived, e.g. from KA=Ks_KMS_A. The transport of this nonce, e.g. included in the voucher, does not need to be encrypted.

A problem may occur if user A disconnects or performs a new bootstrapping whereby the previous key KA=Ks_KMS_A may no longer be valid as a new key KA' may result from the new bootstrapping. When KMS_A receives the voucher, information therein would not be useful in re-creating the session key $K_{AB}$ or $K_{IMA}$.

Therefore, in an alternative of first and second embodiments, KMS_A maintains state and saves previously used keys KA.

In still another alternative, the voucher may include a copy of the key KA, in a voucher-field protected by a key only known to KMS_A. In the latter case only the secret keys need to be maintained and there is no need to maintain individual user state by KMS_A.

According to another alternative of first and second embodiment, the S-CSCF in step 7, FIGS. 4 and 5, may perform steps 9 and 10, FIGS. 4 and 5, on behalf of the user B or, in the group case, each user $B_k$ and replace the voucher by the key generation info and include it directly in the SIP message forwarded in step 8. Alternatively step 8 is performed by some other method e.g. GBA push whereby S-CSCF terminates SIP signalling by sending signal 12.

In the particular case that any of B or $B_k$ may respond to the SIP INVITE signal 8 on any of several available devices some precautions are called for. In this case a responding device has generated a particular key KB' or $KB_k$' from the bootstrapping steps 1 and 2. Therefore, S-CSCF, not knowing which device that will be used to respond to the invite message, must include all possibilities when performing step 9 and repeat step 9 to generate all possible individual keys $K'_{IMB}$. Thus, when S-CSCF finally receives response to the SIP INVITE request 8, an appropriate key $K'_{IMB}$ is prepared and ready for use in step 10.

It is noted that the alternative embodiments described require a different trust model in that the S-CSCF knows the keys for protection of the communication the operator of the SIP core must be trusted. However, this is usually a valid assumption.

Another alternative of first and second embodiment relates to messaging service, i.e. user A sends a message to B or to each of $B_k$ in the group case. The message may be included in the invite message 7 or 7:1. If at least one recipient is determined by S-CSCF to be not registered in the network a message from A may be stored at a network node, exemplary at network node S_CSCF, together with the voucher until the receiver B or $B_k$ registers as active.

Later, when B is registered in the network, the S-CSCF can continue the protocol and push the voucher to B or $B_k$ exemplary using GBA push and inform B or $B_k$ where to find the message. This approach is generally valid for any service which can be handled as a deferred service. Since A may have disconnected and/or performed new bootstrapping, similar mechanisms as discussed above can be used to assert that KMS_A will be able to retrieve the correct key generation information.

Figure 6:
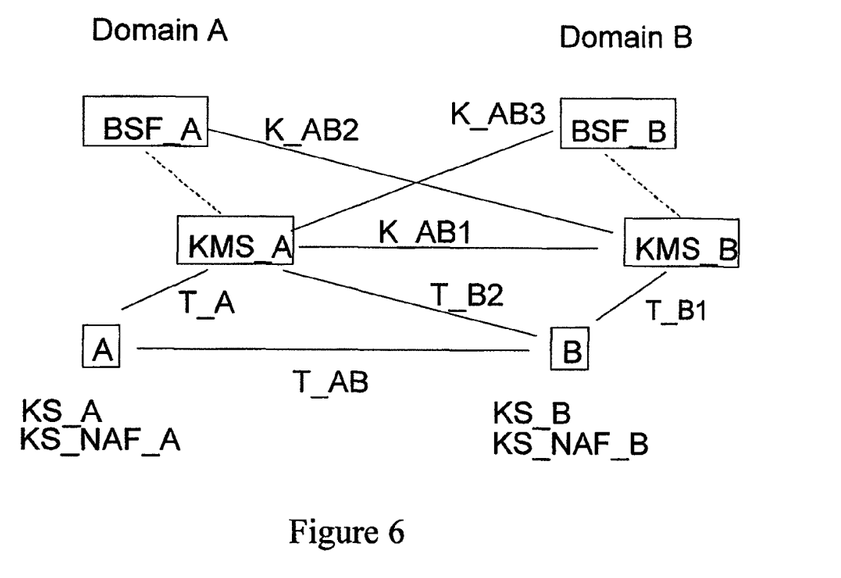
FIG. 6 shows an example of an arrangement of the interfaces.

Although FIG. 3 indicates specific interfaces between functionalities involved in the method according to the invention it is readily understood that the interfaces may be arranged differently in a number of ways e.g. as indicated in FIG. 6. In FIG. 6, T_A and T_B1 interfaces correspond to the known Ua interface according to the GBA method.

The interface T_B2 is an alternative to T_B1 wherein user B communicates with KMS_A instead of with KMS_B.

K_AB1 indicates an interface between KMS-functionalities required when resolving a voucher.

K_AB2 is an inter-domain key management interface between KMS in B's domain and BSF in A's domain. KMS in domain B may use this interface to get assistance in resolving a voucher into a key.

K_AB3 is an inter-domain key management interface between the KMS in A's domain and BSF in B's domain.

It is readily understood that both first and second embodiment provide for lawful intercept at the KMS functionality. An authority knowing the key KA may generate the session key $K_{AB}$ or, in the second embodiment, key $K_{IMA}$ allowing the authority to intercept communication from A towards B or intermediary.

Figure 7:
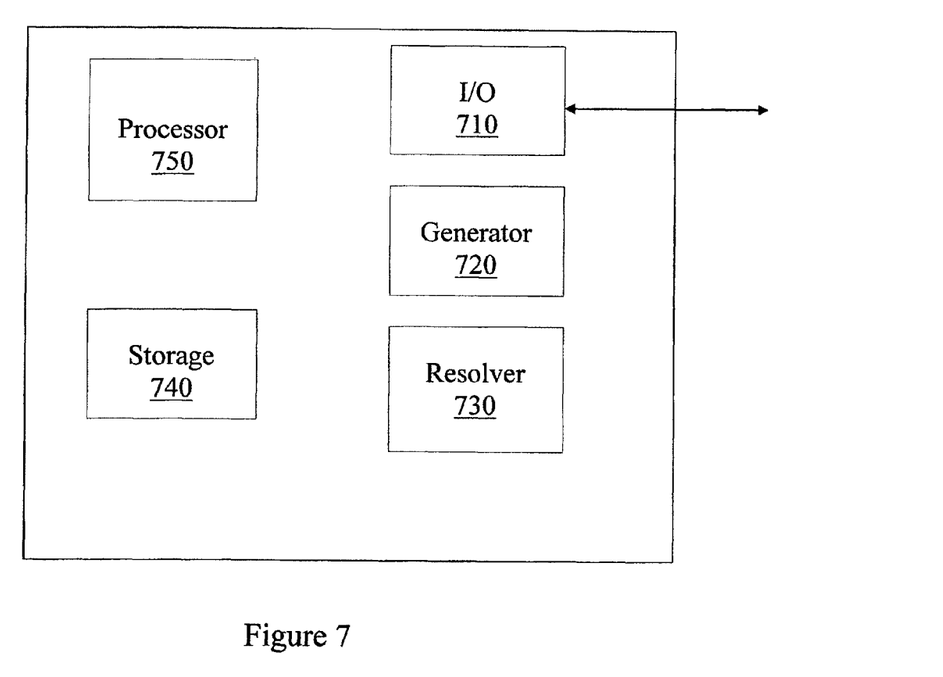
FIG. 7 shows an apparatus according to the invention.

An apparatus according to the invention being supportive in the generation of session keys for secure communication between parties in a communications network is illustrated in FIG. 7.

In FIG. 7 at 710 an input/output unit is shown. The means 710 can communicate key information with other supportive units or end users exemplary receiving from end user a request for key information or a voucher for resolution into key information. Means 710 further provides for communication with supporting bootstrapping functionality to receive key material generated in a bootstrapping procedure.

Means 720 provides for generation of key information such as derivation of key material from bootstrapped information exemplary received from a bootstrapping functionality.

Means 730 processes a received voucher to retrieve stored key information from storage 740. Means 730 can furthermore resolve, possibly in communication with supportive network units, a user group identity into individual group members.

At 750 general processing means provides for the necessary control of the various processes.

The invention thus described by way of non limiting example is readily understood to provide for numerous variations e.g. to implement functional entities, communication interfaces and signalling.

The invention claimed is:

1. A method for establishing secure communication between communication devices in a communications network, the method comprising:
    transmitting, by a first communication device, a request to a first key management server (KMS) apparatus, wherein the first KMS apparatus is configured such that, in response to the request, the first KMS apparatus transmits keying information and a voucher comprising information for retrieving the keying information from the first KMS apparatus;
    receiving, at the first communication device, the keying information and voucher transmitted by the first KMS apparatus; and
    after receiving the transmitted keying information and voucher, transmitting, by the first communication device, a session invitation message for creating a session with a second communication device,
    the session invitation message comprises the voucher, and the second communication device is separate and distinct from the first KMS apparatus.

2. The method of claim 1, further comprising:
    performing, by the first communication device, an initial bootstrapping procedure, wherein as a result of performing the initial bootstrapping procedure the first communication device obtains a first key; and
    generating, by the first communication device, a second key using the first key.

3. The method of claim 2, wherein the first communication device encrypts said request using said second key and the step of transmitting the request comprises transmitting the encrypted request.

4. The method of claim 1, wherein
    said first KMS apparatus is further configured to store the keying information in association with said information for retrieving the keying information that is included in said voucher so that said information for retrieving the keying information can be used by the first KMS apparatus to retrieve the keying information,
    said second communication device being configured to transmit said information for retrieving the keying information to a second KMS apparatus after receiving the invitation message transmitted by the first communication device,
    said second KMS apparatus being configured to forward said information for retrieving the keying information to said first KMS apparatus in response to receiving said information for retrieving the keying information from the second communication device,
    said first KMS apparatus being further configured such that, in response to receiving said information for retrieving the keying information from said second KMS apparatus, the first KMS apparatus i) uses said information for retrieving the keying information to retrieve the keying information and ii) transmits the retrieved keying information to the second KMS apparatus.

5. The method of claim 3, wherein said first KMS apparatus obtains said second key prior to the first communication device transmitting the request.

6. The method of claim 1, wherein the session invitation message is transmitted by the first communication device to the second communication device.

7. The method of claim 1, wherein the session invitation message is transmitted by the first communication device to an intermediary apparatus that is separate and distinct from the first KMS apparatus.

8. The method of claim 7, further comprising:
    the intermediary apparatus, after receiving the session invitation message, forwards the voucher included in the session invitation message to the first KMS apparatus;
    the first KMS apparatus using the voucher received from the intermediary apparatus to obtain a master key; and
    the first KMS apparatus providing to the intermediary apparatus the master key in response to receiving the voucher from the intermediary apparatus.

9. The method of claim 8, wherein the session invitation message includes a group identity and the method further comprises the intermediary apparatus resolving the group identity into a group of user identities.

10. The method of claim 9, further comprising the intermediary apparatus using the master to generate an individual session key for each of the user identities included in the group of user identities.

11. The method of claim 10, further comprising the intermediary apparatus sending the voucher to a party identified by one of the user identities included in the group of user identities.

12. The method of claim 11, wherein the intermediary apparatus sends the voucher to the party by transmitting the voucher to a network node.

13. The method of claim 12, wherein the network node determines that the party is not a registered party and, as a result, stores the voucher until the party registers as active.

14. The method of claim 1, wherein
said first KMS apparatus is further configured to store the keying information in association with said information for retrieving the keying information that is included in said voucher so that said information for retrieving the keying information can be used by the first KMS apparatus to retrieve the keying information.

15. A first key management apparatus, the first key management apparatus comprising:
a receiver;
a transmitter; and
a processor configured to:
use the transmitter to communicate keying information and a voucher comprising an identifier for retrieving the keying information to the a communication device in response to receiving a key request transmitted by the communication device;
store in a storage unit the keying information in association with the identifier;
in response to receiving from a second key management apparatus a message comprising said identifier i) retrieve from the storage unit the keying information and ii) use the transmitter to communicate the retrieved keying information to the second key management apparatus, wherein
the keying information comprises at least one of a) a key (Kab) and b) information from which the key (Kab) can be calculated,
the key request comprises: a first user identifier that identifies a first user; a second user identifier that identifies a second user; and a bootstrapping transaction identifier (B-TID) that is separate and distinct from the first and second user identifiers.

16. The first key management apparatus of claim 15, wherein said B-TID was obtained by the communication device from a bootstrapping transaction server.

17. A method for establishing secure communication between parties in a network, comprising:
receiving, at a first key management apparatus, a key request message transmitted from an initiating party;
generating, at the first key management apparatus, first key information and a voucher in response to the key request message;
communicating the first key information and the voucher to the initiating party;
receiving at least a portion of the voucher from a second key management apparatus as a result of a responding party transmitting a request to the second key management apparatus; and
communicating, to the second key management apparatus, second key information in response to the receiving of the at least a portion of the voucher from the second key management apparatus.

18. The method of claim 17, wherein
the key request message comprises: (i) a first user identifier that identifies the initiating party; (ii) a second user identifier that identifies a responding party; and (iii) a bootstrapping transaction identifier (B-TID) that is separate and distinct from the first and second user identifiers and that was obtained by the iniating party from a bootstrapping transaction function (BSF),
the first key information comprises at least one of (i) a key (Kab) and (ii) information from which a user can calculate the key (Kab), and
the second key information comprises at least one of (i) the key (Kab) and (ii) information from which a user can calculate the key (Kab).

19. The method of claim 17, wherein
the first key information comprises information from which a key (Kab) can be generated,
the voucher includes information enabling the second key management apparatus to generate the key (Kab), and
the voucher further includes an identifier for identifying the initiating party.

20. The method of claim 17, wherein
the first key information comprises a key (Kab), and
the voucher includes information enabling the second key management apparatus to generate the key (Kab), and
the voucher further includes an identifier for identifying the initiating party.

* * * * *